(12) United States Patent
Huang et al.

(10) Patent No.: US 9,841,835 B2
(45) Date of Patent: Dec. 12, 2017

(54) TOUCH DISPLAY SUBSTRATE, ELECTRONIC DEVICE AND DRIVING METHOD

(71) Applicants: Shanghai Tianma Micro-Electronics Co., Ltd., Shanghai (CN); Tianma Micro-Electronics Co., Ltd., Shenzhen (CN)

(72) Inventors: Zhongshou Huang, Shanghai (CN); Zhaokeng Cao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 35 days.

(21) Appl. No.: 14/949,809

(22) Filed: Nov. 23, 2015

(65) Prior Publication Data

US 2017/0045964 A1 Feb. 16, 2017

(30) Foreign Application Priority Data

Aug. 10, 2015 (CN) .......................... 2015 1 0486242

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G09G 2300/0426* (2013.01)

(58) Field of Classification Search
CPC ...... G06F 3/044; G06F 3/0416; G06F 3/0412; G06F 3/041; G09G 2300/0426; G09G 3/3696; G02F 1/13338; G02F 1/13306
See application file for complete search history.

(56) References Cited

U.S. PATENT DOCUMENTS

| | | | | |
|---|---|---|---|---|
| 8,970,537 | B1* | 3/2015 | Shepelev | G06F 3/044 178/18.01 |
| 9,024,913 | B1* | 5/2015 | Jung | G06F 3/044 178/18.06 |
| 9,110,546 | B2* | 8/2015 | Kim | G06F 3/044 |
| 9,182,867 | B2* | 11/2015 | Lee | G06F 3/044 |
| 9,245,490 | B1* | 1/2016 | Cho | G09G 3/3655 |

(Continued)

*Primary Examiner* — Dismery Mercedes
(74) *Attorney, Agent, or Firm* — Alston & Bird LLP

(57) ABSTRACT

Provided are a touch display substrate, an electronic device and a driving method. The touch display substrate includes a common electrode layer and a wire layer arranged opposite to each other. The common electrode layer includes multiple common electrodes arranged in an array. The wire layer includes multiple wires connected to the common electrodes in a one-to-one way. The wires do not intersect with one another and are for inputting touch detection signals to the common electrodes, the wires extend in the same direction and touch detection signals are input to the wires simultaneously, and a phase difference between touch detection signals for at least two adjacent wires is 180 degrees. Interferences on one common electrode from the two wires, for which the touch detection signals have a phase difference of 180 degrees, may cancel each other out, thereby attenuating vertical crosstalk and improving the accuracy of touch detection.

11 Claims, 5 Drawing Sheets

(56) References Cited

U.S. PATENT DOCUMENTS

| | | | | |
|---|---|---|---|---|
| 9,310,931 B2* | 4/2016 | Yousefpor | ............ | G06F 3/0418 |
| 9,372,573 B2* | 6/2016 | Zhao | ............ | G06F 3/0412 |
| 9,465,463 B2* | 10/2016 | Lee | ............ | G09G 3/3648 |
| 9,569,035 B1* | 2/2017 | Lee | ............ | G06F 3/0416 |
| 2009/0109146 A1* | 4/2009 | Minami | ............ | G09G 3/3233 345/76 |
| 2012/0113339 A1* | 5/2012 | Park | ............ | G06F 3/044 349/33 |
| 2013/0307791 A1* | 11/2013 | Edwards | ............ | G06F 3/0416 345/173 |
| 2014/0111446 A1* | 4/2014 | Lee | ............ | G06F 3/0416 345/173 |
| 2014/0160086 A1* | 6/2014 | Lee | ............ | G06F 3/0418 345/178 |
| 2014/0184534 A1* | 7/2014 | Lee | ............ | G06F 3/0412 345/173 |
| 2014/0362031 A1* | 12/2014 | Mo | ............ | G09G 3/36 345/174 |
| 2014/0368459 A1* | 12/2014 | Lei | ............ | G06F 3/044 345/174 |
| 2015/0002421 A1* | 1/2015 | Kim | ............ | G06F 3/041 345/173 |
| 2015/0199044 A1* | 7/2015 | He | ............ | G06F 3/044 345/174 |
| 2015/0309634 A1* | 10/2015 | Lee | ............ | G06F 3/0412 345/173 |
| 2015/0309643 A1* | 10/2015 | Morein | ............ | G06F 3/0416 345/174 |
| 2015/0355777 A1* | 12/2015 | Kwon | ............ | G06F 3/0416 345/174 |
| 2016/0004371 A1* | 1/2016 | Kim | ............ | G06F 3/0418 345/173 |
| 2016/0179251 A1* | 6/2016 | Lee | ............ | G06F 3/044 345/174 |
| 2016/0188005 A1* | 6/2016 | Ju | ............ | G06F 3/0383 345/173 |
| 2016/0202829 A1* | 7/2016 | Choi | ............ | G06F 3/0418 345/174 |
| 2016/0259445 A1* | 9/2016 | Yang | ............ | G06F 3/044 |
| 2016/0299597 A1* | 10/2016 | Yoo | ............ | G06F 3/044 |
| 2016/0320898 A1* | 11/2016 | Tang | ............ | G06F 3/0416 |
| 2017/0003792 A1* | 1/2017 | Berget | ............ | G06F 3/0416 |

* cited by examiner

TOUCH DISPLAY SUBSTRATE, ELECTRONIC DEVICE AND DRIVING METHOD

CROSS REFERENCE OF RELATED APPLICATION

The present application claims the priority to Chinese Patent Application No. 201510486242.0, titled "TOUCH DISPLAY SUBSTRATE, ELECTRONIC DEVICE AND DRIVING METHOD", filed on Aug. 10, 2015 with the State Intellectual Property Office of the People's Republic of China, the content of which is incorporated herein by reference in its entirety.

FIELD

The present disclosure relates to the technical field of touch display, and in particular, to a touch display substrate, an electronic device and a driving method.

BACKGROUND

At the initial stage of development of touch display technology, a touch display panel is formed by a combination of a touch panel and a display panel to achieve touch display function. Using known technologies, the touch panel and the display panel are fabricated independently, resulting in high cost, great thickness, and low production efficiency.

With the development of the self-contained touch display technology, a common electrode of an array substrate of the display panel may also be used as a touch sensing electrode for a self-contained touch detection. Both touch function and display function may be achieved by performing touch control and display control in a time-sharing driving manner. In this case, the touch sensing electrode is integrated in the display panel directly, thereby reducing the fabrication cost and the thickness of the panel and improving the production efficiency.

FIG. 1 is a schematic structural diagram of a general touch display substrate according to conventional technologies. The touch display substrate includes a common electrode layer and a wire layer arranged opposite to each other on a substrate. The common electrode layer includes multiple common electrodes (e.g. common electrode 11) arranged in an array. The wire layer includes multiple wires (e.g. wire 12) connected to the common electrodes in a one-to-one way. An insulation layer is arranged between an end of the wire 12 and the common electrode 11. The end of the wire 12 is connected to the common electrode 11 through a via hole 13, and the other end of the wire 12 is connected to a control circuit 14.

As can be seen in FIG. 1, in a column of common electrodes of the conventional touch display substrate, a wire 12 connected to common electrode 11 at a distal end of the column (an end of the column far away from the control circuit 14) is connected to a touch detection amplifier 14 in a way of striding over other common electrodes 11 in the same column. A touch detection signal transmitted in wire 12 may be coupled to other common electrodes in the same column via parasitic capacitances, thereby resulting in serious vertical crosstalk and affecting the accuracy of the touch detection.

BRIEF SUMMARY OF THE INVENTION

In order to address the above issues, the present disclosure provides a touch display substrate, an electronic device and a driving method, to attenuate vertical crosstalk and improve the accuracy of touch detection.

In order to achieve the above object, the present disclosure provides the following technical solutions.

A touch display substrate includes a common electrode layer and a wire layer arranged opposite to each other;

where the common electrode layer includes multiple common electrodes arranged in an array;

the wire layer includes multiple wires electrically connected to the common electrodes in a one-to-one way, the wires are insulated from one another and do not intersect with one another, and the wires are for inputting touch detection signals to the common electrodes; and there are at least two wires opposite to each of the common electrodes, and a phase difference exists between touch detection signals for the at least two wires and the at least two wires are not electrically connected to the common electrode.

An electronic device is further provided according to the present disclosure, which includes the above touch display substrate.

A driving method is further provided according to the present disclosure, which is applied to the above touch display substrate. The driving method includes multiple display timing periods and multiple touch timing periods which are alternate; and driving all of the common electrodes to perform touch detection in the touch timing period;

where there are at least two wires opposite to each of the common electrodes, and a phase difference exists between touch detection signals for the at least two wires and the at least two wires are not electrically connected to the common electrode.

It can be seen from the above description that, in the touch display substrate according to the present disclosure, a phase difference between touch detection signals for at least two wires is 180 degrees. Interferences from the two wires on one common electrode may cancel each other out, thereby attenuating vertical crosstalk and improving the accuracy of touch detection. The electronic device according to the present disclosure includes the touch display substrate, and thus has a good accuracy of touch detection. The vertical crosstalk can be attenuated and the accuracy of touch detection can be improved by driving the above touch display substrate with the driving method according to the present disclosure.

BRIEF DESCRIPTION OF THE DRAWINGS

The drawings to be used in the description are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION

The technical solutions according to the embodiments of the present disclosure are described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

Figure 1:
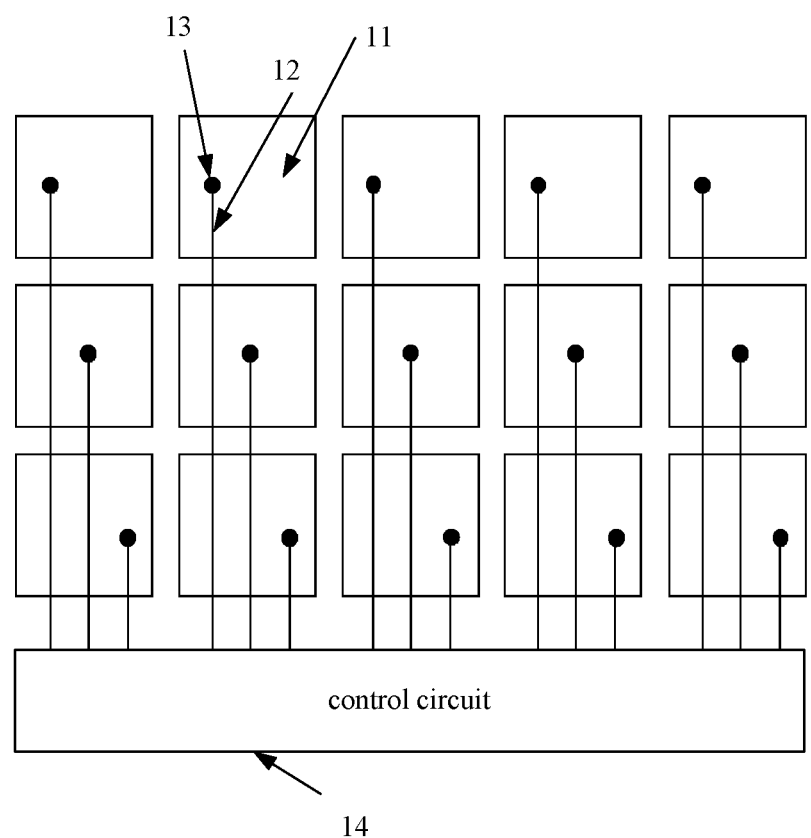
FIG. 1 is a schematic structural diagram of a general touch display substrate according to conventional technologies.

As described in the background, in FIG. 1, wire 12 is connected to a common electrode 11 at a distal end (an end of the column far away from the control circuit 14) and wire 12 is also connected to a touch detection amplifier 14 by striding over other common electrodes in the same column. In this case, a touch detection signal transmitted in wire 12 may be inadvertently coupled to other common electrodes in the same column via parasitic capacitances, resulting in serious vertical crosstalk and affecting the accuracy of touch detection.

In order to avoid the vertical crosstalk, wires electrically connected to common electrodes in a column may be arranged opposite to common electrodes of an adjacent column, and common electrodes in odd columns and common electrodes in even columns may be driven in a time-sharing manner in the touch detection.

In this way, in the touch detection, in a case that the common electrodes in the odd columns are driven to perform touch detection, touch detection signals in wires electrically connected to the common electrodes in the odd columns will not interfere the common electrodes in the even columns because wires electrically connected to the common electrodes in the odd columns are arranged opposite to the common electrodes in the even columns and the common electrodes in the even columns are not in a touch detection state. Similarly, in a case that the common electrodes in the even columns are driven to perform touch detection, touch detection signals in wires electrically connected to the common electrodes in the even columns will not interfere the common electrodes in the odd columns since the common electrodes in the odd columns are not in the touch detection state.

In the above way, the crosstalk may be avoided and the accuracy of touch detection may be improved. However, a period of time for touch detection is prolonged since the common electrodes in the odd columns and the common electrodes in the even columns are driven in the time sharing manner in the touch detection period.

In order to address the above issues, a touch display substrate is provided according to embodiments of the present disclosure. In the touch display substrate, all common electrodes may be scanned simultaneously, so that the period of time for touch detection is short, the vertical crosstalk on the common electrodes from the wires can be attenuated and the accuracy of touch detection can be improved.

Figure 2:
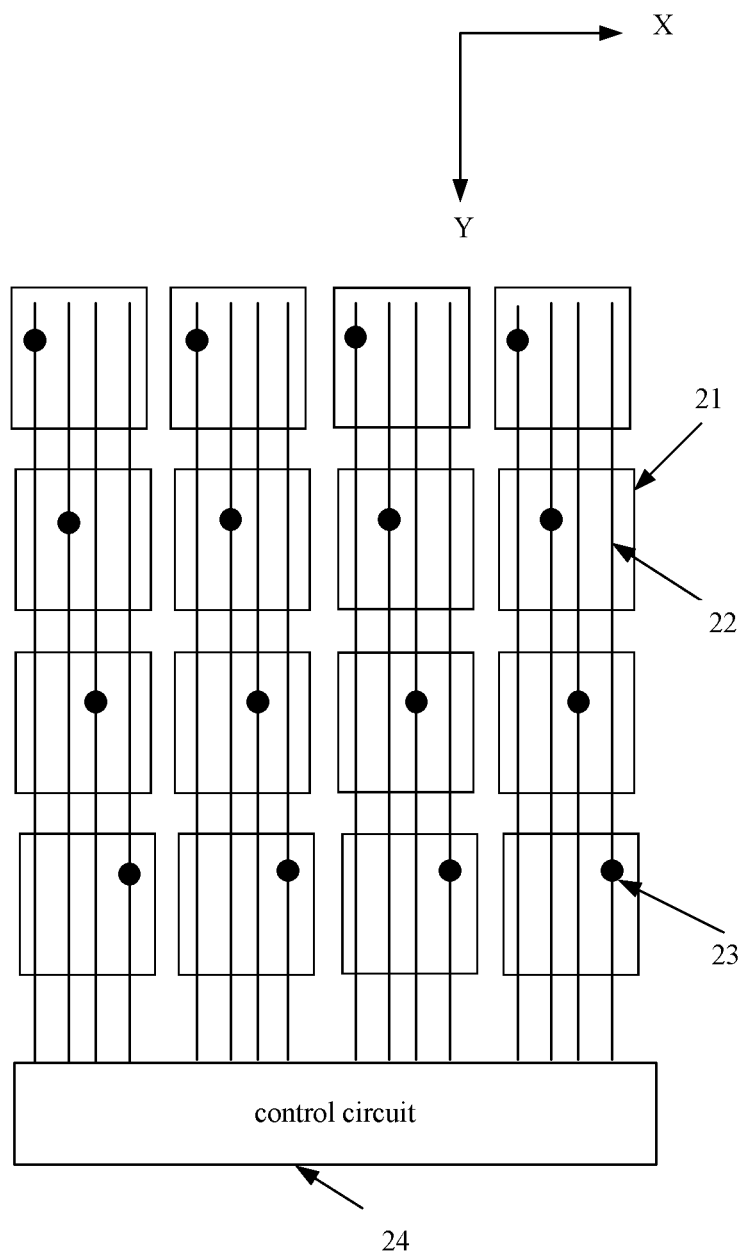
FIG. 2 is a schematic structural diagram of a touch display substrate according to an embodiment of the present disclosure.

FIG. 2 is a schematic structural diagram of a touch display panel according to an embodiment of the present disclosure.

The touch display panel includes a common electrode layer and a wire layer arranged opposite to each other.

The common electrode layer includes multiple common electrodes arranged in an array.

The wire layer includes multiple wires (e.g. wire 22) electrically connected to the common electrodes (e.g. common electrode 21) in a one-to-one way. The wires are insulated from one another and do not intersect with one another. The wires are for inputting touch detection signals to the common electrodes.

In the embodiment shown in FIG. 2, the wires each extend in a same direction. In a touch timing period for the touch display substrate, touch detection signals are input to the wires simultaneously to drive all of the common electrodes to perform touch detection. In a direction perpendicular to the common electrode layer, at least two wires are arranged opposite to a common electrode 21, and a phase difference exists between touch detection signals for the at least two wires.

Vertical crosstalk on one common electrode 21 opposite to but not connected to any two wires for which the phase difference exists between the touch detection signals, from the two wires, may cancel each other out. Optionally, the phase difference may be 180 degrees. In a case that the phase difference between the touch detection signals for the two wires is 180 degrees, the crosstalk from the two wires on the common electrode 21 can cancel each other out completely.

Optionally, all the wires extend in the same direction. As shown in FIG. 2, the wires each extend in a column direction Y of the array.

For two adjacent wires where a phase difference between touch detection signals is 180 degrees, a touch detection effect of a common electrode 21 opposite to the two adjacent wires (the common electrode 21 is not electrically connected to the two adjacent wires) may be interfered by the two adjacent wires due to a vertical crosstalk in the direction perpendicular to the common electrode layer. In this case, since the phase difference between the touch detection signals for the two wires is 180 degrees, interferences on the common electrode 21 from the two wires can cancel each other out, thereby attenuating the vertical crosstalk and improving the accuracy of touch detection.

As described above, in the touch display substrate according to the embodiment of the present disclosure, a phase difference between touch detection signals for at least two wires is 180 degrees. In this case, interferences on the same common electrode from the two wires may cancel each other out, thereby attenuating the vertical crosstalk and improving the accuracy of touch detection.

The touch display substrate according to the embodiment of the present disclosure further includes a control circuit 24 configured to drive the common electrodes to perform touch detection.

The touch display substrate according to the embodiment of the present disclosure includes a display region and a frame region surrounding the display region. The common electrode layer and the wire layer are arranged in the display region and the control circuit 24 is arranged in the frame region. The common electrode layer and the wire layer are made of transparent conductive materials such as Indium Tin Oxide (ITO).

Figure 3:
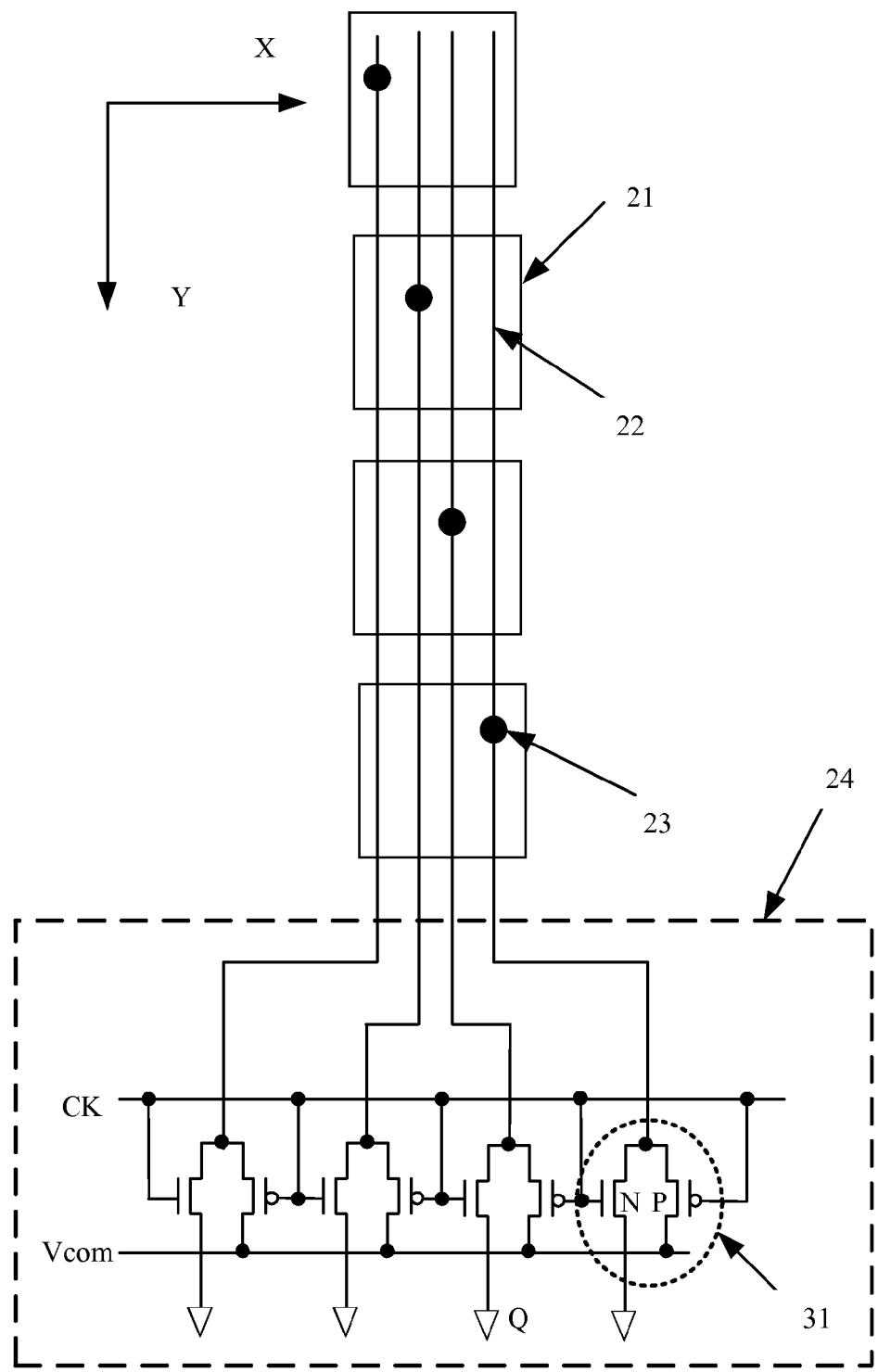
FIG. 3 is a schematic structural diagram of a touch display substrate according to an embodiment of the present disclosure.

A structure of the control circuit 24 may be shown in FIG. 3.

FIG. 3 is a schematic structural diagram of a touch display substrate according to an embodiment of the present disclosure. For simplification, only one column of common electrodes is shown in FIG. 3.

The control circuit 24 includes multiple switch transistor groups connected to the wires in a one-to-one way and multiple touch detection amplifiers Q connected to the switch transistor groups 31 in a one-to-one way. The switch transistor group 31 includes a first switch N and a second switch P. The first switch N and the second switch P each have a control end, a first electrode and a second electrode. An on-state voltage of the first switch N is different from an on-state voltage of the second switch P.

A clock signal CK is input to the control end of the first switch N and the control end of the second switch P. The first electrode of the first switch N and the first electrode of the second switch P are connected to a respective wire. The second electrode of the first switch N is connected to a respective touch detection amplifier Q. A common voltage $V_{com}$ is input to the second electrode of the second switch P.

The on-state voltage of the first switch N is different from the on-state voltage of the second switch P. Optionally, the first switch N is an N-channel Metal Oxide Semiconductor (NMOS) and the second switch P is a P-channel Metal Oxide Semiconductor (PMOS). The NMOS is turned on with a high voltage level and is turned off with a low voltage level, and the PMOS is turned on with the low voltage level and is turned off with the high voltage level.

In the embodiment shown in FIG. 3, a displaying function and a touching function of the touch display substrate may be driven in a time sharing manner by the control circuit 24. In a touch timing period, all of the common electrodes may be driven to perform touch detection.

In the touch timing period, a first clock signal may be input to switch transistor groups 31 corresponding to the common electrodes via one clock signal line, to turn on the first switches N and turn off the second switches P. In this case, the common electrodes may be electrically connected to respective touch detection amplifiers Q for touch detection. In a display timing period, a second clock signal is input to the switch transistor groups 31 corresponding to the common electrodes via the clock signal line, to turn off the first switches N and turn on the second switches P. In this case, the common voltage $V_{com}$ is input to the common electrodes to control displaying.

In a case that the first switch N is an NMOS and the second switch P is a PMOS, the first clock signal is a high voltage level and the second clock signal is a low voltage level.

The control circuit 24 control conducting states of the switch transistor groups via one clock signal line, thereby driving the touching function and the displaying function in the time sharing manner with a simple circuit structure, a convenient control and a low cost.

In the touch display substrate according to the embodiment of the present disclosure, the common electrode layer includes the common electrodes arranged in an array of m rows×n columns with m and n being positive integers larger than 1.

The wire layer includes the wires of which the number is m×n, and the wires are connected to common electrodes through via holes respectively. In a direction perpendicular to the common electrode layer, a projection of a via hole onto the common electrode layer is within a common electrode corresponding to the via hole. The embodiment shown in FIG. 2 is described by taking both m and n equaling to 4 as an example.

Optionally, the wires are arranged to extend in a column direction Y of the array, and the wires are arranged spaced apart from one another in a row direction X of the array. It should be noted that, the column direction Y is a direction from a common electrode in a first row to a common electrode in a last row in a column of common electrodes. The row direction X is a direction from a common electrode in a first column to a common electrode in a last column in a row of common electrodes.

In the embodiments shown in FIG. 2 and FIG. 3, the wires have the same length and width. In order to attenuate the vertical crosstalk significantly, a phase difference between touch detection signals for any two adjacent wires is set to be 180 degrees and the number of wires is set to be an even number, that is, m×n equals to an even number. In the embodiments shown in FIG. 2 and FIG. 3, optionally, wires corresponding to common electrodes in any one of the columns are arranged opposite to the common electrodes in the column respectively, that is, projections of the wires corresponding to the common electrodes in the column in the direction perpendicular to the common electrode layer is within a region including the column of common electrodes.

In a case where the common electrodes are driven simultaneously to perform touch detection, two adjacent wires not electrically connected to one common electrode 21 may interfere the touch detection of the common electrode 21. If a phase difference between touch detection signals for any two adjacent wires is 180 degrees, interferences on the common electrode 21 from the two wires cancel each other out, thereby improving the accuracy of touch detection. Since the number of common electrodes arranged in the whole touch display substrate is an even number, the number of wires corresponding to the common electrodes is an even number, and a phase difference between touch detection signals for any two adjacent wires is set to be 180 degrees, thereby cancelling interference each other out and improving the accuracy of touch detection greatly.

In the above embodiment, other wires exist on two sides of a wire electrically connected to a common electrode, since the wire electrically connected to the common electrode does not interfere the common electrode, if phases of touch detection signals for two wires closest to the wire electrically connected to the common electrode are the same, interferences on the common electrode from the two closest wires may not be cancelled and the vertical crosstalk on the common electrode from the two wires closest to the wire electrically connected to the common electrode may still exist.

Figure 4:
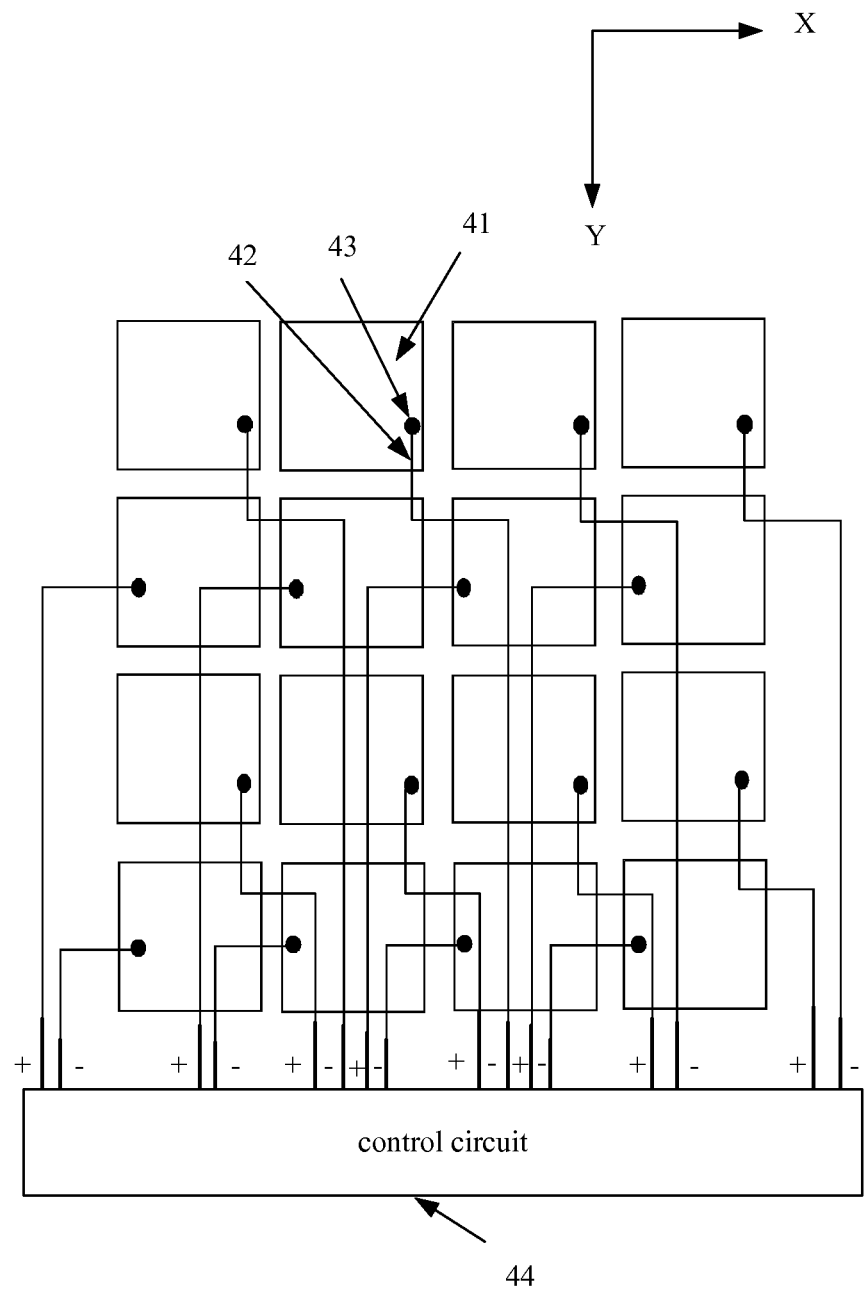
FIG. 4 is a schematic structural diagram of a touch display substrate according to an embodiment of the present disclosure.

In order to further attenuate the vertical crosstalk and further improve the accuracy of touch detection for the touch display substrate, a touch display substrate is provided according to an embodiment of the present disclosure, as shown in FIG. 4.

The touch display substrate shown in FIG. 4 includes multiple common electrodes (e.g. common electrode 41) arranged in an array, wires (e.g. wire 42) connected to the common electrodes in a one-to-one way, via holes through which the common electrodes are respectively connected to the wires, and a control circuit 44. The embodiment shown in FIG. 4 is different from the embodiments shown in FIG. 2 and FIG. 3 in that the shape and arrangement of wires are changed. In FIG. 4, '+' and '−' represent that a phase difference between touch detection signals for wires is 180 degrees. Phases for touch detection signals input to wires and a driving principle are the same as those in the above embodiments, which are not described herein.

In the embodiment shown in FIG. 4, one of the wires includes a first connection portion connected to a via hole 43 and a second connection portion connected to the first connection portion. The second connection portion is connected to the control circuit 44 and the second connection portion is shaped in a straight line which is parallel to the column direction.

For a column of common electrodes, second connection portions of wires electrically connected to common electrodes in odd rows and second connection portions of wires electrically connected to common electrodes in even rows are respectively arranged on two sides of the column of common electrodes.

Among m wires corresponding to common electrodes in the same column, first connection portions of the wires are shaped in a fold line and shaped in a straight line which are arranged alternately in the column direction Y. An angle of 90 degrees is formed in a first connection portion shaped in a fold line. In the embodiment shown in FIG. 4, first connection portions of wires electrically connected to common electrodes in odd rows are shaped in a fold line, and first connection portions of wires electrically connected to common electrodes in even rows are shaped in a straight line which is parallel to the row direction X. Similarly, the wires each extend in the column direction Y, and the wires are arranged spaced apart from one another in the row direction and do not intersect with one another.

In the embodiment shown in FIG. 4, for a common electrode 41 in a first row, only a wire 42 electrically connected to the common electrode 41 exist in the column direction Y, hence the common electrode 41 is not interfered by wires electrically connected to other common electrodes.

For a common electrode 41 in other rows, a wire 42 electrically connected to the common electrode 41 is arranged opposite to common electrodes in a column adjacent to the column including the common electrode 41 with a first connection portion of the wire 42, and there are an even number of wires striding over the common electrode 41 in the column direction Y, which are electrically connected to other common electrodes. For any one of common electrodes in other rows, since the number of wires electrically connected to other common electrodes is an even number, and a phase difference between touch detection signals for two adjacent wires is 180 degrees, interferences on the common electrode 41 from the wires electrically connected to other common electrodes may cancel each other out completely if an interference on the common electrode 41 from a first connection portion of the wire 42 electrically connected to the common electrode 41 is negligible, thereby greatly improving the accuracy of touch detection.

It can be seen from the above description that, the vertical crosstalk in the touch timing period may be avoided effectively and the accuracy of touch detection may be greatly improved with the touch display substrate according to the embodiment of the present disclosure.

Figure 5:
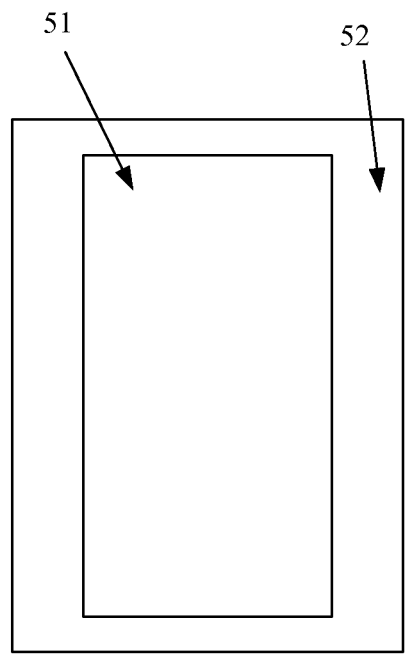
FIG. 5 is a schematic structural diagram of an electronic device according to an embodiment of the present disclosure.

Based on the above embodiments of touch display substrate, an electronic device is provided according to an embodiment of the present disclosure, as shown in FIG. 5. FIG. 5 is a schematic structural diagram of the electronic device according to the embodiment of the present disclosure. The electronic device includes a touch display substrate 51 and a non-touch display region 52.

The touch display substrate 51 is the touch display substrate according to any one of the above embodiments. Therefore, the accuracy of touch detection for the electronic device is high.

Based on the above embodiments of touch display substrate, a driving method is further provided according to an embodiment of the present disclosure, which is applied to the touch display substrate according to the above embodiments. The driving method includes multiple display timing periods and multiple touch timing periods which are alternate. In the touch timing period, all of the common electrodes are driven to perform touch detection. For any one of the common electrodes, a phase difference exists between touch detection signals for at least two wires opposite to the common electrode, and the two wires are not electrically connected to the common electrode.

Optionally, in the above driving method, a phase difference between touch detection signals input to any two wires is 180 degrees, in order to significantly reduce touch interference.

Figure 6:
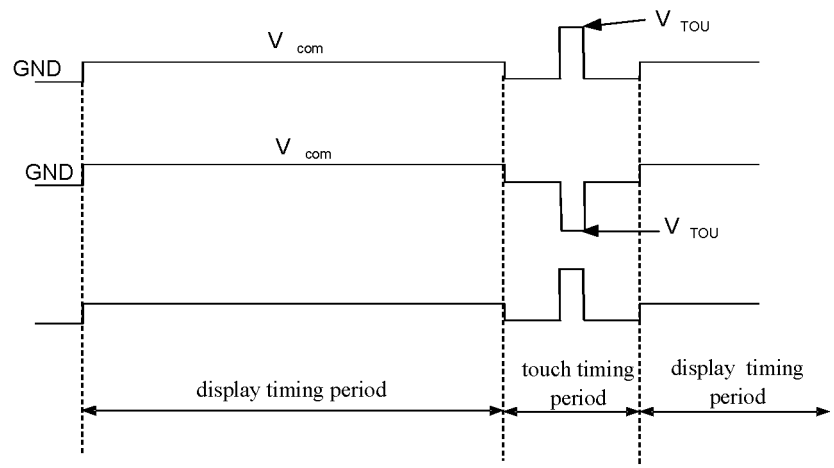
FIG. 6 is a phase timing diagram according to an embodiment of the present disclosure.

FIG. 6 is a phase timing diagram according to an embodiment of the present disclosure. FIG. 6 illustrates timing waveform of touch detection signals for three adjacent wires opposite to one common electrode in a direction perpendicular to the common electrode layer.

For the three adjacent wires, the touch detection signals are a common voltage $V_{com}$ in the display timing period, and the touch detection signals are a grounded signal GND between the touch timing period and the display timing period.

It can be seen that, in one touch timing period, a phase difference between touch detection signals $V_{TOU}$ for two adjacent wires is 180 degrees, which is needed to cancel out the vertical crosstalk on one common electrode from two wires.

The vertical crosstalk can be attenuated and the accuracy of touch detection can be improved by driving the above touch display substrate with the driving method according to the present disclosure.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A touch display substrate, comprising:
   a common electrode layer comprising a plurality of common electrodes arranged in an array;
   a wire layer, comprising a plurality of wires electrically connected to the plurality of common electrodes in a one-to-one association, wherein the wires are insulated from one another and do not intersect with one another, and the wires are used for inputting touch detection signals to the plurality of common electrodes;
   wherein at least two wires are arranged opposite to the one of the plurality of common electrodes, and the at least two wires are not electrically connected to said common electrode, voltages having an opposite polarity are supplied to the at least two wires respectively at a same time within a touch timing period for inputting the touch detection signals;
   a control circuit configured to drive the plurality of common electrodes to perform touch detection, wherein the control circuit comprises a plurality of switch transistor groups connected to the plurality of wires in a one-to-one way and a plurality of touch detection amplifiers connected to the plurality of switch transistor groups in a one-to-one way, wherein the plurality of switch transistor groups each comprises a first switch and a second switch, and the first switch and the second switch each comprise a control end, a first electrode and a second electrode; and wherein a clock signal is input to the control end of the first switch and the control end of the second switch, wherein the first electrode of the first switch and the first electrode of the second switch are connected to one of the plurality of wires, the second electrode of the first switch is connected to a touch detection amplifier, and wherein a common voltage is input to the second electrode of the second switch.

2. The touch display substrate according to claim 1, wherein all of the plurality of wires extend in a same direction.

3. The touch display substrate according to claim 1, wherein the common electrode layer comprises the common electrodes arranged in an array of m rows×n columns with m and n being positive integers larger than 1;

wherein the wire layer comprises the wires of which the number is m×n, the wire is electrically connected to a common electrode corresponding to the wire through a via hole, and a projection of the via hole onto the common electrode layer in a direction perpendicular to the common electrode layer is within the common electrode corresponding to the via hole.

4. The touch display substrate according to claim 3, wherein the plurality of wires each extends in a column direction of the array and the wires are arranged spaced apart from one another in a row direction of the array.

5. The touch display substrate according to claim 4, wherein the plurality of wires each has a same length and a same width.

6. The touch display substrate according to claim 4, wherein the plurality of wires each comprises a first connection portion connected to the via hole and a second connection portion connected to the first connection portion, wherein the second connection portion is connected to the control circuit, and the second connection portion is shaped in a straight line parallel to the column direction;

for a column of common electrodes, second connection portions of wires connected to common electrodes in odd rows and second connection portions of wires connected to common electrodes in even rows are respectively arranged on two sides of the column of common electrodes; and wherein first connection portions of m wires electrically connected to common electrodes in a same column are shaped in a fold line and shaped in a straight line which are arranged alternately in the column direction, wherein an angle of 90 degrees is formed in a first connection portion shaped in a fold line.

7. The touch display substrate according to claim 1, wherein the voltages having an opposite polarity are supplied to any two adjacent wires respectively at the same time within the touch timing period for inputting the touch detection signals.

8. The touch display substrate according to claim 7, wherein the number of the wires is an even number.

9. An electronic device, comprising:
a touch display substrate comprising:
a common electrode layer;
a wire layer;
wherein the common electrode layer comprises a plurality of common electrodes arranged in an array;
wherein the wire layer comprises a plurality of wires electrically connected to the plurality of common electrodes in a one-to-one way, wherein the plurality of wires are insulated from one another and do not intersect with one another, and the wires are used for inputting touch detection signals to the common electrodes;
wherein at least two wires are arranged opposite to the one of the plurality of common electrodes, and the at least two wires are not electrically connected to said common electrode, voltages having an opposite polarity are supplied to the at least two wires respectively at a same time within a touch timing period for inputting the touch detection signals;
a control circuit configured to drive the plurality of common electrodes to perform touch detection, wherein the control circuit comprises a plurality of switch transistor groups connected to the plurality of wires in a one-to-one way and a plurality of touch detection amplifiers connected to the plurality of switch transistor groups in a one-to-one way, wherein the plurality of switch transistor groups each comprises a first switch and a second switch, and the first switch and the second switch each comprise a control end, a first electrode and a second electrode; and wherein a clock signal is input to the control end of the first switch and the control end of the second switch wherein the first electrode of the first switch and the first electrode of the second switch are connected to one of the plurality of wires, the second electrode of the first switch is connected to a touch detection amplifier, and wherein a common voltage is input to the second electrode of the second switch.

10. A driving method for driving the touch display substrate according to claim 1, comprising:
arranging a plurality of alternating display timing periods and touch timing periods; and
driving the plurality of common electrodes to perform touch detection in the touch timing period.

11. The driving method according to claim 10, wherein the voltages having an opposite polarity are supplied to any two adjacent wires respectively at the same time within the touch timing period for inputting the touch detection signals.

* * * * *